(12) United States Patent
Zhao et al.

(10) Patent No.: US 10,048,526 B2
(45) Date of Patent: Aug. 14, 2018

(54) BEZEL-FREE DISPLAY DEVICE

(71) Applicants: BOE TECHNOLOGY GROUP CO., LTD., Beijing (CN); BEIJING BOE DISPLAY TECHNOLOGY CO., LTD., Beijing (CN)

(72) Inventors: Feng Zhao, Beijing (CN); Dan Wang, Beijing (CN); Seungmin Lee, Beijing (CN); Bin Zou, Beijing (CN); Junjie Guo, Beijing (CN); Yutao Hao, Beijing (CN)

(73) Assignees: BOE TECHNOLOGY GROUP CO., LTD. (CN); BEIJING BOE DISPLAY TECHNOLOGY CO., LTD. (CN)

(*) Notice: Subject to any disclaimer, the term of this patent is extended or adjusted under 35 U.S.C. 154(b) by 0 days.

(21) Appl. No.: 15/609,095

(22) Filed: May 31, 2017

(65) Prior Publication Data

US 2017/0261804 A1 Sep. 14, 2017

Related U.S. Application Data (62) Division of application No. 14/418,144, filed as application No. PCT/CN2014/080424 on Jun. 20, 2014, now Pat. No. 9,696,572.

(30) Foreign Application Priority Data

Jan. 28, 2014 (CN) .......................... 2014 1 0043592

(51) Int. Cl.
*G02F 1/1333* (2006.01)
(52) U.S. Cl.
CPC .................. *G02F 1/133308* (2013.01); *G02F 2001/133317* (2013.01); *G02F 2201/465* (2013.01)

(58) Field of Classification Search
CPC ......... G02F 1/133308; G02F 1/133317; G02F 2201/465
See application file for complete search history.

(56) References Cited

U.S. PATENT DOCUMENTS

| 2001/0036057 A1 | 11/2001 | Fukuyoshi |
| 2010/0171901 A1 | 7/2010 | Tsubokura |

(Continued)

FOREIGN PATENT DOCUMENTS

| CN | 102236180 A | 11/2011 |
| CN | 102236181 A | 11/2011 |

(Continued)

OTHER PUBLICATIONS

First Office Action for Chinese Application No. 201410043592.5, dated Dec. 3, 2015, 7 Pages.

(Continued)

*Primary Examiner* — Jessica M Merlin
(74) *Attorney, Agent, or Firm* — Brooks Kushman P.C.

(57) ABSTRACT

The present disclosure provides a bezel-free display device, including a display panel including a display surface and a back surface opposite to the display surface, a panel connector, one end of which is secured onto a peripheral region of the back surface, and the other end of which is provided with a first support surface, a first snap-on member being provided on the first support surface, and a backlight module including a back plate and a sealant both arranged at a side of the back surface, the sealant being secured onto a periphery of the back plate and arranged at a position corresponding to the panel connector, one end of the sealant adjacent to the display panel being provided with a second support surface cooperating with the first support surface, a second snap-on member cooperating with the first snap-on member being provided on the second support surface.

8 Claims, 5 Drawing Sheets

(56) References Cited

U.S. PATENT DOCUMENTS

| | | |
|---|---|---|
| 2011/0260959 A1 | 10/2011 | Son et al. |
| 2011/0260989 A1* | 10/2011 | Tho .................. G02F 1/133308 345/173 |
| 2011/0261282 A1 | 10/2011 | Jean et al. |
| 2012/0241774 A1 | 9/2012 | Chen et al. |
| 2012/0262855 A1 | 10/2012 | Park et al. |
| 2012/0262907 A1 | 10/2012 | Lee et al. |
| 2013/0033660 A1 | 2/2013 | Choi et al. |
| 2013/0128613 A1 | 5/2013 | Tang |
| 2014/0120275 A1 | 5/2014 | Lu et al. |
| 2014/0176852 A1* | 6/2014 | Ha .................. G02F 1/133308 349/58 |
| 2014/0204281 A1 | 7/2014 | Maeda |
| 2015/0009444 A1 | 1/2015 | Zhao et al. |
| 2015/0160502 A1 | 6/2015 | Chen et al. |
| 2015/0219953 A1 | 8/2015 | Chen et al. |
| 2015/0289398 A1* | 10/2015 | Takase ............. G02F 1/133308 428/138 |

FOREIGN PATENT DOCUMENTS

| | | |
|---|---|---|
| CN | 102654660 A | 9/2012 |
| CN | 102749758 A | 10/2012 |
| CN | 102750879 A | 10/2012 |
| CN | 102799000 A | 11/2012 |
| CN | 202533677 U | 11/2012 |
| CN | 102809833 A | 12/2012 |
| CN | 102819129 A | 12/2012 |
| CN | 202615076 U | 12/2012 |
| CN | 202720414 U | 2/2013 |
| CN | 102998822 A | 3/2013 |
| CN | 103197445 A | 7/2013 |
| CN | 103792706 A | 5/2014 |
| JP | 2002169143 A | 6/2002 |
| WO | 2013035601 A1 | 3/2013 |

OTHER PUBLICATIONS

International Search Report and Written Opinion for Application No. PCT/CN2014/080424, dated Oct. 27, 2014, 10 Pages.

* cited by examiner

BEZEL-FREE DISPLAY DEVICE

CROSS-REFERENCE TO RELATED APPLICATIONS

This application is a divisional of U.S. application Ser. No. 14/418,144 filed Jan. 29, 2015, which is the U.S. national phase of PCT Application No. PCT/CN2014/080424 filed on Jun. 20, 2014, which claims priority to Chinese Patent Application No. 201410043592.5 filed on Jan. 28, 2014, the disclosures of which are hereby incorporated in their entirety by reference herein.

TECHNICAL FIELD

The present disclosure relates to the field of display technology, in particular to a bezel-free display device.

BACKGROUND

Liquid crystal displays (LCDs) have been widely used due to such advantages as being thin, power-saving, and free of radiation. Most of the LCDs available in the market are backlight LCDs, each of which includes a liquid crystal display panel and a backlight module. Along with the development of the manufacturing techniques, there exists such a trend to provide a narrow-bezel, and even bezel-free, LCD, and the way of securing the liquid crystal display panel of the bezel-free LCD has become an important topic. Currently, for an existing bezel-free LCD, the following ways of securing the liquid crystal display panel to a backlight unit are mainly provided.

Figure 1:
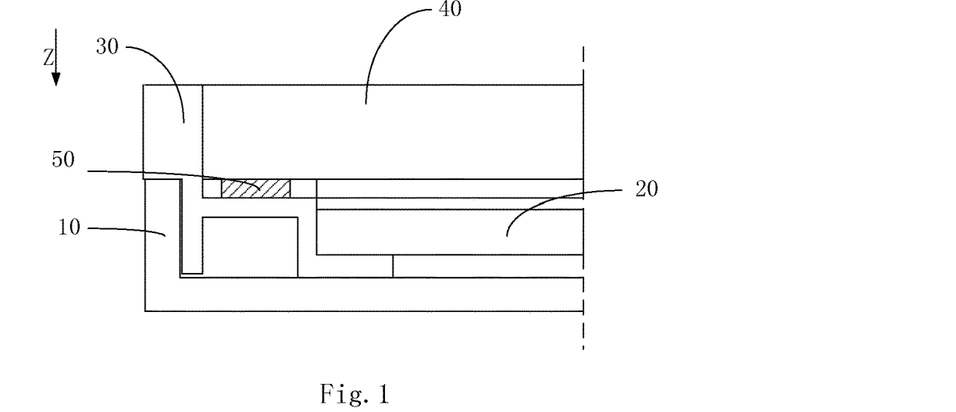
FIG. 1 is a schematic view showing a first way of securing a display panel to a backlight unit for an existing bezel-free display device.

As a first way, the liquid crystal display panel is directly adhered onto the backlight unit. As shown in FIG. 1, the backlight unit of the LCD includes a back plate 10, an optical member 20 and a sealant 30. The optical member 20 is disposed within the back plate 10, and a back portion of a liquid crystal display panel 40 is directly adhered onto the sealant 30 of the backlight unit by means of a double-sided adhesive 50. This securing way is simple and easy to be implemented. However, due to the direct adhesion of the liquid crystal display panel 40 onto the backlight unit, the liquid crystal display panel 40 is devoid of freedom, especially in a Z direction. When the liquid crystal display panel 40 (especially an ADS-mode or IPS-mode liquid crystal display panel) is pressed, it is unable to cushion such a pressure applied onto the liquid crystal display panel, thereby a L0 light leakage will occur for the liquid crystal display panel.

As a second way, the liquid crystal display panel is secured onto the backlight unit by means of a connector. However, there exist the following disadvantages for a connection structure of the connector adopted by the existing bezel-free LCD.

An inappropriate connection structure of the connector will adversely affect the strength of the entire liquid crystal display panel, reduce the reliability thereof and render the L0 light leakage. In addition, due to the existence of the connector, a slimming degree of the LCD will be adversely affected, i.e., the existing connection structure of the connector between the liquid crystal display panel and the backlight unit will be adverse to the slimming of the display device. The existing connection structure of the connector is required to be positioned extremely precisely at a junction. Moreover, it is difficult in the prior art to technically implement the connection structure of the connector adopted by the bezel-free LCD.

SUMMARY

An object of the present disclosure is to provide a bezel-free display device, so as to provide a bezel-free design, improve the quality of the entire module and facilitate the assembly thereof, thereby to improve the production efficiency and reduce the production cost.

The present disclosure provides a bezel-free display device, including:
  a display panel including a display surface and a back surface opposite to the display surface;
  a panel connector, wherein one end of the panel connector is secured onto a peripheral region of the back surface of the display panel, and the other end of the panel connector is provided with a first support surface for supporting the display panel, a first snap-on member being provided on the first support surface; and
  a backlight module including a back plate and a sealant both arranged at a side opposite to the back surface of the display panel, the sealant being secured onto a periphery of the back plate and arranged at a position corresponding to the panel connector, one end of the sealant adjacent to the display panel being provided with a second support surface cooperating with the first support surface to support the display panel, a second snap-on member cooperating with the first snap-on member being provided on the second support surface, and the first snap-on member being secured to the second snap-on member by snapping.

Further, a cushion member is provided between the first support surface and the second support surface.

Further, the first snap-on member includes a hook protruded from the first support surface, the second snap-on member includes a slot formed on the second support surface and depressed inward, and the hook can be elastically deformed and secured into the slot by snapping when a pressure is applied onto the display panel in a direction toward the back plate.

Alternatively, the first snap-on member includes a slot formed on the first support surface and depressed inward, the second snap-on member includes a hook protruded from the second support surface, and the hook can be elastically deformed and secured into the slot by snapping when a pressure is applied onto the display panel in a direction toward the back plate.

Further, the first support surface includes a first planar surface parallel to the back surface of the display panel and a first guide surface for guiding and positioning the first snap-on member and the second snap-on member, and the first snap-on member is formed on the first guide surface. The second support surface includes a second planar surface cooperating with the first planar surface and a second guide surface cooperating with the first guide surface, and the second snap-on member is formed on the second guide surface.

Further, the first guide surface includes a first oblique surface inclined relative to the display panel, and the second guide surface includes a second oblique surface at an inclination angle identical to the first oblique surface.

Further, the first snap-on member includes an insert member formed on the first support surface, and the insert member includes an extension part connected to the first support surface and extending in a direction away from the display panel, and a head connected to one end of the extension part away from the display panel. The second snap-on member includes a hole formed in the second support surface and an accommodation cavity, the hole communicates with the accommodation cavity and the head is accommodated in the accommodation cavity. An inner diameter of the hole is greater than an outer diameter of the extension part and less than an outer diameter of the head. When a pressure is applied onto the display panel in a direction toward the back plate, the hole can be elastically deformed so as to allow the head to enter the accommodation cavity, and then cooperate with the head to achieve snap-on connection.

Further, a third guide surface for guiding the head is provided at an open end of the hole adjacent to the panel connector, and a fourth guide surface cooperating with the third guide surface is provided at an end surface of the head away from the display panel.

Further, a predetermined cavity depressed inward and communicating with the accommodation cavity is formed at an outer surface of the sealant, so as to facilitate the detachment of the insert member in the hole.

Further, the first snap-on member includes an insert member formed on the second support surface, and the insert member includes an extension part connected to the second support surface and extending in a direction close to the display panel, and a head connected to one end of the extension part close to the display panel. The second snap-on member includes a hole formed in the first support surface and an accommodation cavity, the hole communicates with the accommodation cavity and the head is accommodated in the accommodation cavity. An inner diameter of the hole is greater than an outer diameter of the extension part and less than an outer diameter of the head. When a pressure is applied onto the display panel in a direction toward the back plate, the hole can be elastically deformed so as to allow the head to enter the accommodation cavity, and then cooperate with the head to achieve snap-on connection.

Further, a third guide surface for guiding the head is provided at an open end of the hole away from the panel connector, and a fourth guide surface cooperating with the third guide surface is provided at an end surface of the head adjacent to the display panel. The panel connector is secured onto the display panel by means of an adhesion member.

Further, the panel connector is of an integral structure arranged continuously around a peripheral region of the display panel, or separated structures arranged discontinuously around the peripheral region of the display panel.

The present disclosure has the following advantageous effects. According to the present disclosure, the display panel of the bezel-free display device may be secured onto the backlight unit through the first snap-on member on the panel connector and the second snap-on member on the sealant, so it is able to provide a simple structure as well as to facilitate the snap-on connection and the assembly thereof. In addition, the display panel may be supported by the sealant, and it is unnecessary to provide a panel support member separately, so it is able to slim the bezel-free display device. Moreover, it is able to ensure the freedom of the display panel in a Z direction through the first snap-on member and the second snap-on member on the first support surface and the second support surface, respectively, thereby to prevent L0 light leakage for a large-size ADS-mode or IPS-mode liquid crystal display panel. Further, due to the panel connector on the display panel, it is able to reinforce the strength of the entire display panel, thereby to improve the quality of the entire display module.

DETAILED DESCRIPTION

The principles and features of the present disclosure will be described hereinafter in conjunction with the drawings. The following embodiments are for illustrative purposes only, but shall not be used to limit the scope of the present disclosure.

As shown in FIGS. 2-6, a bezel-free display device of the present disclosure includes:

a display panel 100 including a display surface and a back surface opposite to the display surface;

a panel connector 200, one end of which is secured onto a peripheral region of the back surface of the display panel 100, and the other end of which is provided with a first support surface 201 for supporting the display panel 100, a first snap-on member being provided on the first support surface 201; and a backlight module including a back plate 300 and a sealant 400 both arranged at a side of the back surface of the display panel 100, the sealant 400 being secured onto a periphery of the back plate 300 and arranged at a position corresponding to the panel connector 200, one end of the sealant 400 adjacent to the display panel 100 being provided with a second support surface 401 cooperating with the first support surface 201 to support the display panel 100, a second snap-on member cooperating with the first snap-on member being provided on the second support surface 401, and the first snap-on member being secured to the second snap-on member by snapping.

According to the present disclosure, the display panel 100 of the bezel-free display device may be secured onto the backlight unit through the first snap-on member on the panel connector 200 and the second snap-on member on the sealant 400, so it is able to provide a simple structure as well as to facilitate the snap-on connection and the assembly thereof. In addition, the display panel 100 may be supported by the sealant 400, and it is unnecessary to provide a panel support member separately, so it is able to slim the bezel-free display device. Moreover, it is able to ensure the freedom of the display panel 100 in a Z direction through the first snap-on member and the second snap-on member on the first support surface 201 and the second support surface 401, respectively, thereby to prevent L0 light leakage for a large-size ADS-mode or IPS-mode liquid crystal display panel. Further, due to the panel connector 200 on the display panel 100, it is able to reinforce the strength of the entire display panel 100, thereby to improve the quality of the entire display module.

It should be appreciated that, the display panel of the bezel-free display device in the present disclosure is alternatively a liquid crystal display panel, which includes an upper substrate 110, a low substrate 11 and liquid crystals arranged between the upper and lower substrates. An upper polarizer 113 is arranged above the upper substrate 110, and a lower polarizer 114 is arranged below the lower substrate 111.

Further, a cushion member is provided between the first support surface 201 and the second support surface 401. Due to the cushion member, it is able to prevent L0 light leakage for the large-size ADS-mode or IPS-mode liquid crystal display panel 100 when a Z-direction pressure is applied onto the display panel 100.

Further, the cushion member may be a pad 500 made of a soft material. It should be appreciated that, during the actual application, the structure of the cushion member is not limited thereto.

Further, a guiding and positioning mechanism for guiding and positioning the first snap-on member and the second snap-on structure is provided between the first support surface 201 and the second support surface 401. Through the guiding and positioning mechanism, it is able to accurately and conveniently position the first snap-on member and the second snap-on member, thereby to facilitate the assembly.

Further, the panel connector 200 is secured onto the display panel 100 by means of an adhesion member 600. In this embodiment, the display panel 100 may be adhered onto the panel connector 200 by means of the adhesion member such as a double-sized adhesive, so as to form a display panel module (Panel Ass'y). It should be appreciated that, during the actual application, the ways for securing the display panel 100 onto the panel connector 200 are not limited thereto.

Further, the panel connector 200 may be of an integral structure arranged continuously around a peripheral region of the display panel 100. In this way, it is able to provide a large contact area between the panel connector 200 and the display panel 100, thereby to reinforce the strength of the entire display panel 100. In addition, the panel connector may also be of separated structures arranged discontinuously around the peripheral region of the display panel 100.

In addition, in the bezel-free display panel of the present disclosure, the first snap-on member and the second snap-on member may cooperate with each other in various ways. In order to illustrate the present disclosure in a better manner, the alternative ways for securing the panel connector 200 to the sealant 400 of the bezel-free display device will be described hereinafter.

First Embodiment

Figure 2:
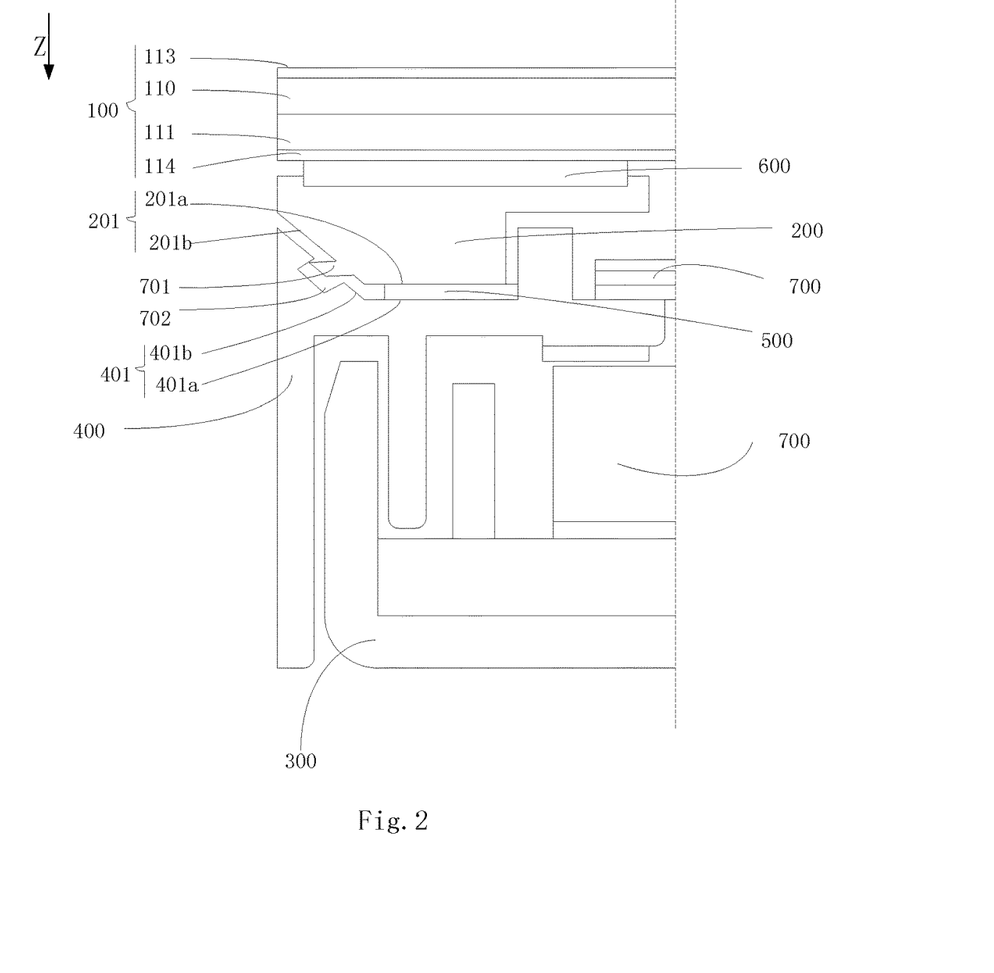
FIG. 2 is a schematic view showing a bezel-free display device according to the first embodiment of the present disclosure.

As shown in FIG. 2, which is a schematic view showing the bezel-free display device according to the first embodiment of the present invention, the bezel-free display device includes the display panel 100, the panel connector 200 and the backlight module. The display panel 100 includes the display surface and the back surface opposite to the display surface. One end of the panel connector 200 is secured onto the peripheral region of the back surface of the display panel 100, and the other end thereof is provided with the first support surface 201 for supporting the display panel 100. The first snap-on member is formed on the first support surface 201, and the display panel 100 and the panel connector 200 constitute the display panel module.

The backlight module includes the back plate 300, the sealant 400 and an optical assembly 700. The back plate 300 and the sealant 400 are both arranged at a side of the back surface of the display panel 100, and the optical assembly 700 is secured in an accommodation cavity in the middle of the back plate 300. The sealant 400 is connected to a periphery of the back plate 300 by means of a hook, so as to form a backlight unit (BLU).

The sealant 400 is arranged at a position corresponding to the panel connector 200, and the second support surface 401 cooperating with the first support surface 201 100 is formed at one end of the sealant 400 adjacent to the display panel 100, so as to support the display panel 100. The second snap-on member cooperating with the first snap-on member is formed at the second support surface 401, and the first snap-on member is secured to the second snap-on member by snapping.

As shown in FIG. 2, in this embodiment, the first snap-on member includes a hook 701 protruded from the first support surface 201, the second snap-on member includes a slot 702 formed on the second support surface 401 and depressed inward, and the hook 701 can be elastically deformed and secured into the slot 702 by snapping when a pressure is applied onto the display panel 100 in a direction toward the back plate 300 (i.e., in a Z direction). In this embodiment, the panel connector 200 is secured to the sealant 400 by means of the hook 701 and the slot 702, and as a result, it is able to provide a simple structure and facilitate the assembly thereof.

As shown in FIG. 2, the first support surface 201 alternatively includes a first planar surface 201a parallel to the back surface of the display panel 100 and a first guide surface for guiding and positioning the first snap-on member and the second snap-on member, and the first snap-on member is formed on the first guide surface. The second support surface 401 includes a second planar surface 401a cooperating with the first planar surface 201a and a second guide surface cooperating with the first guide surface, and the second snap-on member is formed on the second guide surface. The guiding mechanism consists of the first guide surface and the second guide surface, but it should be appreciated that, the guiding mechanism may be of any other structure during the actual application.

Alternatively, the first guide surface includes a first oblique surface 201b inclined relative to the display panel 100, and the second guide surface includes a second oblique surface 401b at an inclination angle identical to the first oblique surface 201b. In this embodiment, it is able to guide and position the hook 701 and the slot 702 by means of the oblique surfaces. It should be appreciated that, during the actual application, the first guide surface and the second guide surface may be of any other structures, i.e., curved surfaces cooperating with each other, and they will not be particularly defined herein.

Alternatively, the first oblique 201b is formed at a periphery of the first planar surface 201a, the second oblique surface 401b is formed at a periphery of the second planar surface 401a, and a distance between the first oblique surface 201b and the display panel 100 gradually decreases from a side adjacent to the first planar surface 201a to a side away from the first planar surface 201a. In other words, the first oblique surface 201b is inclined in a direction from outside to inside and from top to bottom, so as to facilitate the assembling of the display panel 100 and the backlight unit. It should be appreciated that, during the actual application, the positions and number of the first oblique surfaces 201b and the second oblique surfaces 401b may be adjusted in accordance with the practical needs.

In this embodiment, the pad 500 is arranged between the first planar surface 201a and the second planar surface 401a, so as to cushion the pressure applied onto the display panel 100 in the Z direction.

Second Embodiment

Figure 3:
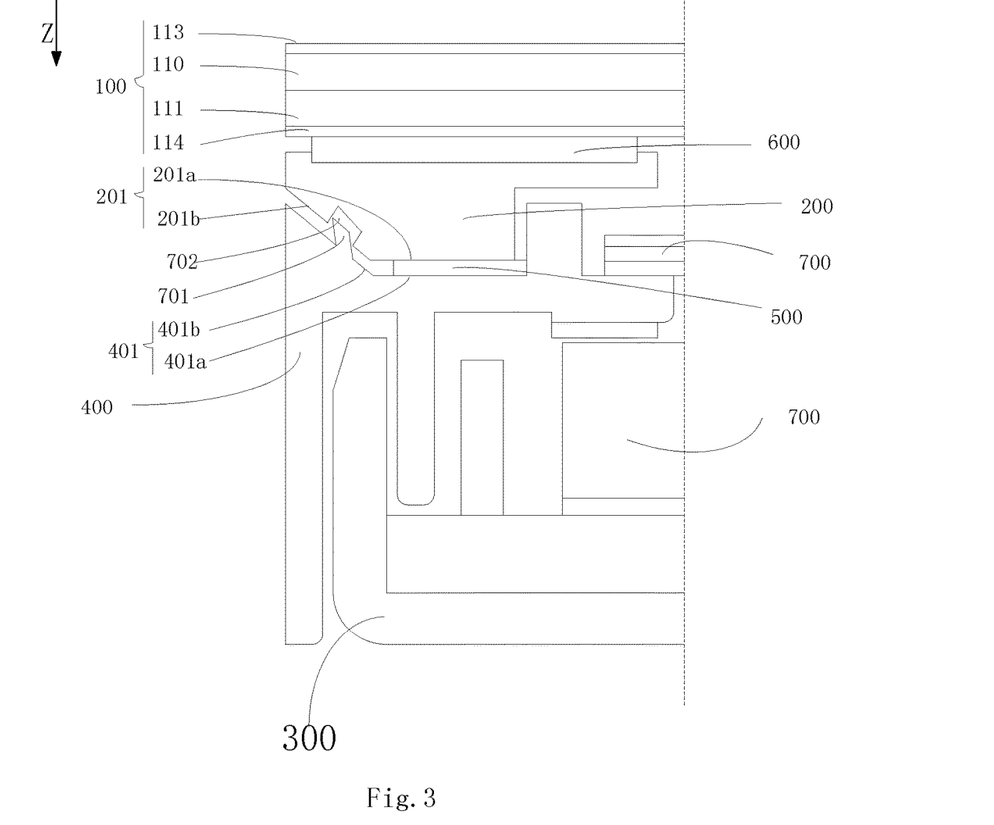
FIG. 3 is a schematic view showing the bezel-free display device according to the second embodiment of the present disclosure.

As shown in FIG. 3, which is a schematic view showing the bezel-free display device according to the second embodiment of the present disclosure, similar to that in the first embodiment, the hook 701 and the slot 702 are also used to secure the panel connector 200 to the sealant 400, and during the assembly, the panel connector 200 and the sealant 400 are also guided and positioned by means of the oblique surfaces. This embodiment differs from the first embodiment merely in that the first snap-on member includes the slot 702 formed on the first support surface 201 and depressed inward, the second snap-on member includes the hook 701 protruded from the second support surface 401, and the hook 701 can be elastically deformed and secured into the slot 702 by snapping when a pressure is applied onto the display panel 100 in a direction toward the back plate 300.

Third Embodiment

Figure 4:
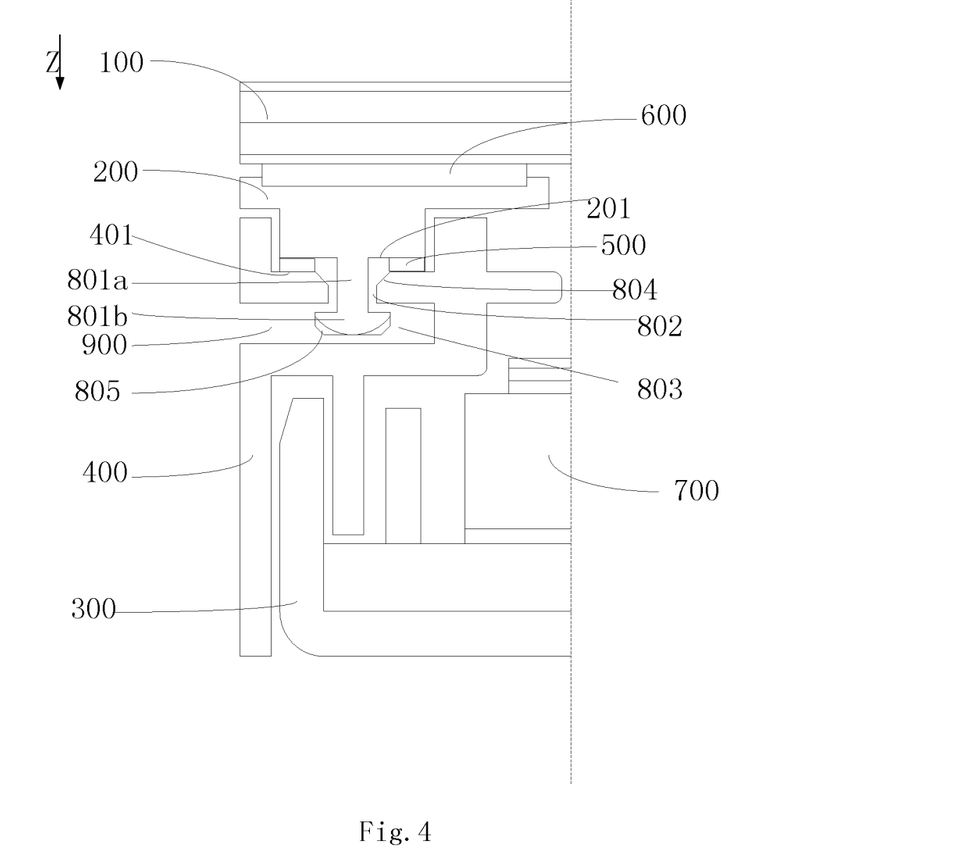
FIG. 4 is a schematic view showing the bezel-free display device according to the third embodiment of the present disclosure.

As shown in FIG. 4, which is a schematic view showing the bezel-free display device according to the third embodiment, this embodiment differs from the first embodiment in that the first snap-on member is secured to the second snap-on member in a button connection manner.

To be specific, as shown in FIG. 4, the first snap-on member includes an insert member formed on the first support surface 201, and the insert member includes an extension part 801a connected to the first support surface 201 and extending in a direction away from the display panel 100, and a head 801b connected to one end of the extension part 801a away from the display panel 100.

The second snap-on member includes a hole 802 formed in the second support surface 401 and an accommodation cavity 803 with which the hole 802 communicates and in which the head 801b is accommodated.

In this embodiment, the insert member on the panel connector 200 will apply a pressure onto the display panel 100 in a direction toward the back plate 300 (i.e., in the Z direction) when assembling the display device, and the hole 802 can be elastically deformed so as to allow the head 801b to pass therethrough and enter the accommodation cavity 803. Because an outer diameter of the head 801b is greater than an inner diameter of the hole 802, the head 801b will cooperate with the hole 802 so as to achieve the snap-on connection.

Alternatively, a third guide surface for guiding the head 801b is provided at an open end of the hole 802 adjacent to the panel connector 200, and a fourth guide surface cooperating with the third guide surface is provided at an end surface of the head 801b away from the display panel 100. Through the third and fourth guide surfaces, it is able to facilitate the insertion of the head 801b of the insert member into the hole 802.

Figure 6:
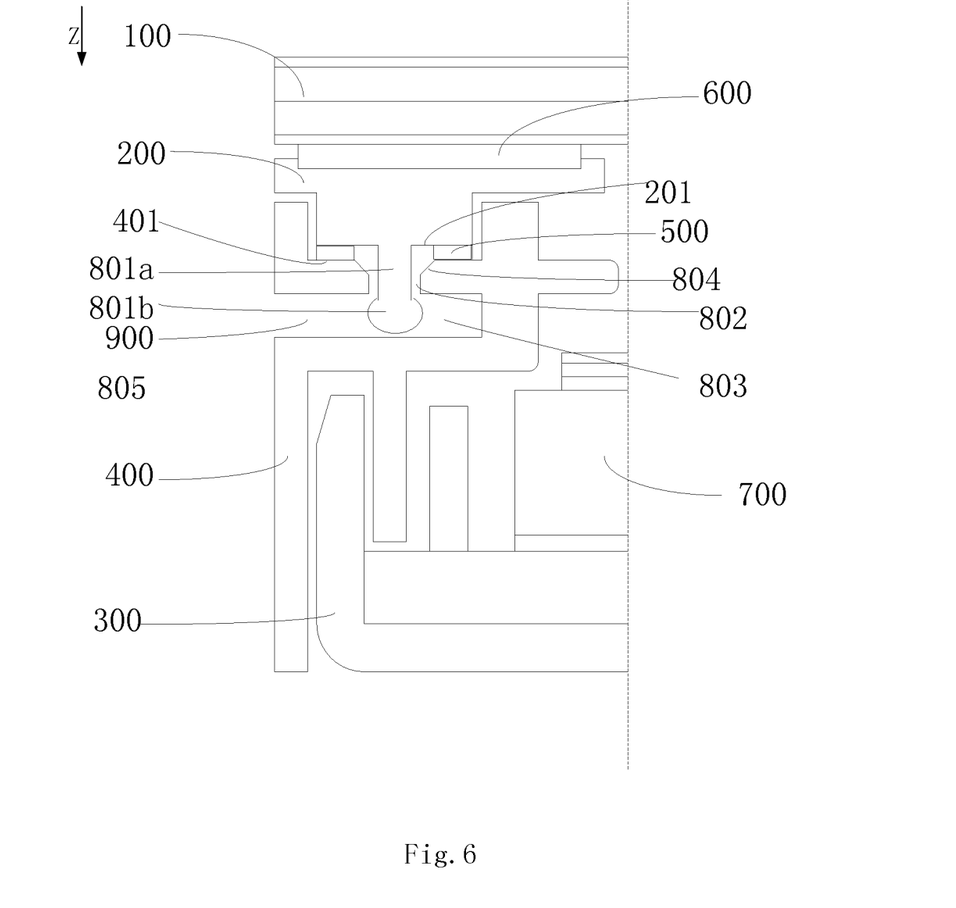
FIG. 6 is a schematic view showing the bezel-free display device according to the fifth embodiment of the present disclosure.

As shown in FIG. 4, the third guide surface is formed by a third oblique surface 804 of the open end of the hole 802, and the fourth guide surface is formed by a fourth oblique surface 805 provided at one end of the head 801b. It should be appreciated that, during the actual application, the third guide surface and the fourth guide surface may be of any other structures, e.g., curved surfaces cooperating with each other, or the head 801b may be of a spherical shape (as shown in FIG. 6).

In addition, alternatively a predetermined cavity 900 depressed inward and communicating with the accommodation cavity 803 is formed at an outer surface of the sealant 400, so as to facilitate the detachment of the insert member in the hole 802. When it is desired to detach the display panel 100 from the backlight unit, a pressure may be applied through the predetermined cavity 900 to the head 801b of the insert member in a direction toward the display panel 100, so as to enable the hole 802 to be elastically deformed, thereby to remove the head 801b of the insert member out of the hole 802 and to detach the display panel 100 from the backlight unit.

In this embodiment, the pad 500 may be arranged between the first support surface 201 and the second support surface 401.

Fourth Embodiment

Figure 5:
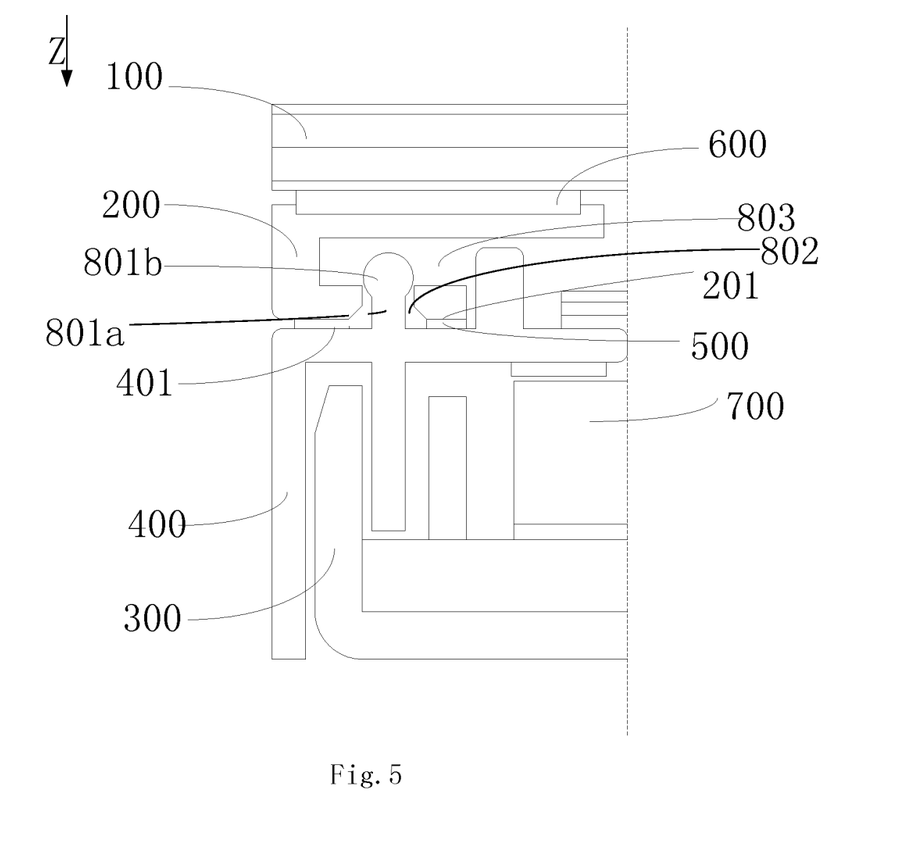
FIG. 5 is a schematic view showing the bezel-free display device according to the fourth embodiment of the present disclosure.

As shown in FIG. 5, which is a schematic view showing a bezel-free display device according to the fourth embodiment of the present disclosure, similar to the third embodiment, the panel connector 200 is also secured to the sealant 400 by means of the hole 802 and the insert member.

However, different from the third embodiment, in this embodiment the second snap-on member includes the insert member formed on the second support surface 401, and the insert member includes the extension part 801a connected to the second support surface 401 and extending in a direction close to the display panel 100, and the head 801b connected to one end of the extension part 801a close to the display panel 100. The first snap-on member includes the hole 802 formed in the first support surface 201 and the accommodation cavity 803 formed in the panel connector 200 and communicating with the hole 802. An inner diameter of the hole 802 is greater than an outer diameter of the extension part 801a and less than an outer diameter of the head 801b.

Further, the third guide surface for guiding the head 801b is provided at an open end of the hole 802 away from the panel connector 200, and the fourth guide surface cooperating with the third guide surface is provided at an end surface of the head 801b adjacent to the display panel 100.

In this embodiment, when assembling the display device, a pressure may be applied by the insert member on the panel connector 200 to the display panel 100 in a direction toward the back plate 300 (i.e., in the Z direction), and the hole 802 may be elastically deformed so as to allow the head 801b to pass therethrough and enter the accommodation cavity 803. Because the outer diameter of the head 801b is greater than the inner diameter of the hole 802, the head 801b will cooperate with the hole 802 so as to achieve the snap-on connection.

In addition, in this embodiment, the accommodation cavity 803 is arranged on the panel connector 200, and different from the third embodiment, it is unnecessary to provide a predetermined cavity outside the sealant 400.

It should be appreciated that, in the other embodiments of the present disclosure, any combination of the above-mentioned structures may also be applied for the first snap-on member and the second snap-on member.

The above are merely the alternative embodiments of the present disclosure. It should be appreciated that, a person skilled in the art may make further modifications and improvements without departing from the principle of the present disclosure, and these modifications and improvements shall also fall within the scope of present disclosure.

What is claimed is:

1. A bezel-free display device, comprising:
   a display panel comprising a display surface and a back surface opposite to the display surface;
   a panel connector, wherein one end of the panel connector is secured onto a peripheral region of the back surface of the display panel, and the other end of the panel connector is provided with a first support surface for supporting the display panel, a first snap-on member being provided on the first support surface; and
   a backlight module comprising a back plate and a sealant both arranged at a side of the back surface of the display panel, the sealant being secured onto a periphery of the back plate and arranged at a position corresponding to the panel connector, one end of the sealant adjacent to the display panel being provided with a second support surface cooperating with the first support surface to support the display panel, a second snap-on member cooperating with the first snap-on member being provided on the second support surface, and the first snap-on member being secured to the second snap-on member by snapping;
   wherein the first snap-on member comprises an insert member formed on the first support surface, and the insert member comprises an extension part connected to the first support surface and extending in a direction away from the display panel, and a head connected to one end of the extension part away from the display panel,
   the second snap-on member comprises a hole formed in the second support surface and an accommodation cavity, the hole communicates with the accommodation cavity and the head is accommodated in the accommodation cavity, and
   an inner diameter of the hole is greater than an outer diameter of the extension part and less than an outer diameter of the head, and the hole is configured to be able to be elastically deformed so as to allow the head to enter the accommodation cavity, and then cooperate with the head to achieve snap-on connection.

2. The bezel-free display device according to claim 1, wherein
   a third guide surface for guiding the head is provided at an open end of the hole adjacent to the panel connector, and a fourth guide surface cooperating with the third guide surface is provided at an end surface of the head away from the display panel.

3. The bezel-free display device according to claim 2, wherein
   the third guide surface is an oblique surface formed at the open end of the hole, and the fourth guide surface is an oblique surface formed at the end surface of the head.

4. The bezel-free display device according to claim claim 1, wherein
   a predetermined cavity depressed inward and communicating with the accommodation cavity is formed at an outer surface of the sealant, so as to facilitate the detachment of the insert member in the hole.

5. The bezel-free display device according to claim 1, wherein
   a third guide surface for guiding the head is provided at an open end of the hole away from the panel connector, and a fourth guide surface cooperating with the third guide surface is provided at an end surface of the head adjacent to the display panel.

6. The bezel-free display device according to claim 5, wherein
   the third guide surface is an oblique surface formed at the open end of the hole, and the fourth guide surface is an oblique surface formed at the end surface of the head.

7. The bezel-free display device according to claim 1, wherein
   the panel connector is secured onto the display panel by means of an adhesion member.

8. The bezel-free display device according to claim 1, wherein
   the panel connector is of an integral structure arranged continuously around a peripheral region of the display panel, or separated structures arranged discontinuously around the peripheral region of the display panel.

* * * * *